May 30, 1933.  J. THOMPSON  1,912,105
LID SUPPORTING MEANS FOR CABINETS OR BOXES
Filed Dec. 5, 1930  2 Sheets-Sheet 1

INVENTOR
JOHN THOMPSON
BY
ATTORNEY

May 30, 1933.  J. THOMPSON  1,912,105
LID SUPPORTING MEANS FOR CABINETS OR BOXES
Filed Dec. 5, 1930    2 Sheets-Sheet 2

INVENTOR
JOHN THOMPSON
BY
*John J Hanrahan*
ATTORNEY

UNITED STATES PATENT OFFICE

JOHN THOMPSON, OF NEWTOWN, WEDNESBURY, ENGLAND, ASSIGNOR TO COLUMBIA PHONOGRAPH COMPANY, INC., OF BRIDGEPORT, CONNECTICUT, A CORPORATION OF NEW YORK

LID SUPPORTING MEANS FOR CABINETS OR BOXES

Application filed December 5, 1930, Serial No. 500,290, and in Great Britain December 14, 1929.

This invention relates to devices for supporting in an open position lids of cabinets or boxes or the like, such as lids of gramophone cabinets, portable gramophones or wireless sets, filing or storage cabinets, packing cases etc.

The object of the invention is to provide a support which will act efficiently without attention from the operator and which will be simple in operation and cheap to construct, and with these objects in view the invention consists in a lid support formed of members adapted, as the lid is being opened, automatically to assume relative positions necessary to support the lid.

The invention further consists in a lid support adapted, as the lid is about to be closed, automatically to assume a released or non-supporting position.

The invention also consists in a lid support comprising an arm pivotally attached to the lid, adapted to co-operate with an arm pivotally attached to the cabinet or box, in such a manner that the arms automatically assume the relative positions necessary to lock together to form a support, as the lid is being opened, and automatically assume relative positions of release as the lid is about to be closed, in order to allow closure to be effected.

Further features of the invention will become apparent from the following description of one modification thereof, which will be more easily understood with reference to the accompanying drawings, representing in operative positions during various stages of the automatic action the lid support, and parts thereof, according to one form of the invention.

In these drawings, which all show side views of part of a cabinet fitted with a lid support according to the invention, Figure 1 represents the lid and support in closed position;

Figure 1:
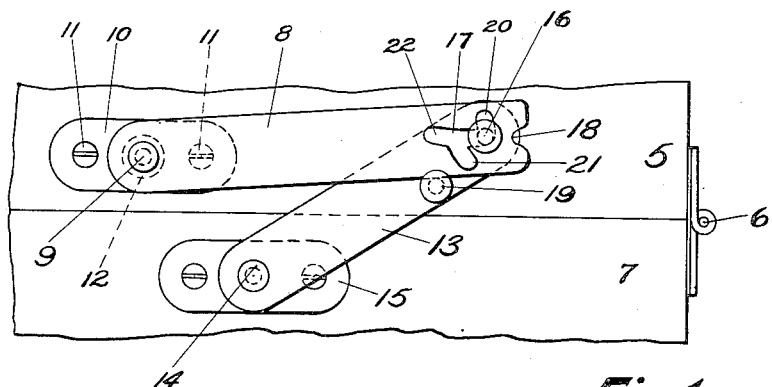

Referring to the drawings, 5 represents a portion of the lid of a cabinet attached by a hinge 6 to the cabinet, a portion of which is shown as 7. To the lid is attached an arm or strut 8 by means of a headed pin 9 which is rigid with a plate 10, held as by screws 11 to the lid. The arm 8 can pivot about the pin 9, but the freedom of such pivotal movement is restricted by a friction washer 12 inserted between the arm 8 and the plate 10.

In a similar manner a second arm 13 is attached to the cabinet near the edge adjacent to the lid, by pivotal mounting on a pin 14 integral with a plate 15, held to the cabinet by screws. No friction washer is inserted in contact with this arm 13 which is thus allowed completely free pivotal movement.

At their movable ends the arms are connected together, such as by a headed pin 16 integral with the arm 13, riding in a slot 17 cut in the arm 8. The slot 17 is preferably formed of three passages arranged to meet at a common point substantially in Y formation, and the passages are so shaped and connected as to guide the pin 16 in a prearranged circuit, (to be described in more detail below), when the arms 8 and 13 are subjected to relative movement, say by the opening and closing of the lid.

Figure 3:
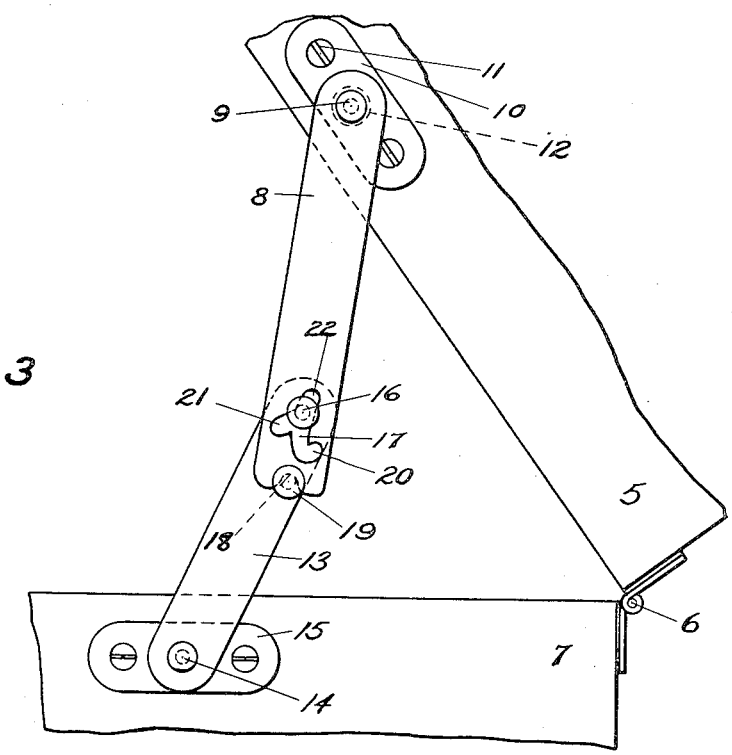
Fig. 3 represents the support holding up the lid in its final supported position when open.

The outer extremity of the arm 8 has cut therein a semi-circular slot 18, thus forming a forked tip, which is adapted to be seated on another pin 19 on the arm 13 when the lid is open, and when, therefore, the arms 8 and 13 are in an extended position, as shown in Fig. 3. With the arms in this position and the slots 17 and 18 engaging respectively with pins 16 and 19 the two arms become rigidly associated and act as a support for the lid. In this supported position the lid is almost, but not quite, in its extreme open position; the small additional opening movement available is necessary to ensure the automatic action of the supporting arms, which will now be described in detail.

Figure 2:
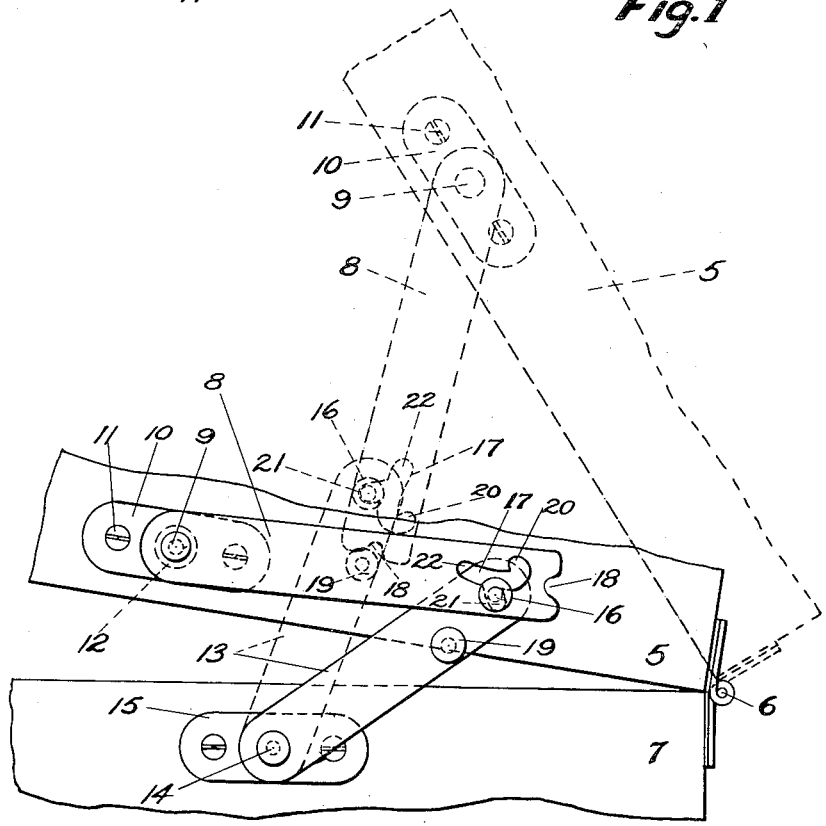
Fig. 2 represents the lid during opening and (in dotted line) at its extreme open position.

The passages of the slot 17 will be referred to as 20, the initial position of the pin 16 and its permanent position when the lid is closed; 21, an intermediate position of the pin 16 occupied only during the process of opening the lid; and 22 the position of pin 16 when the arms are acting as a support and occupied only when the lid is in its open supported position. These passages are indicated by the numerals referred to in the drawings, and as seen in Figure 1 with the lid closed the pin 16 occupies the passage 20. As the lid is opened the arm 8 on account of its friction connection, by means of washer 12, with the lid, rises therewith, thus causing the arm 13 to pivot about pin 14 resulting in the movement of pin 16 in slot 17 to fall into passage 21. This is shown clearly in the full lines of Fig. 2, and from that it will be clear that further opening of the lid causes the arm 8 to be pulled (against the washer 12) to an extended position represented by dotted lines in Figure 2.

The lid is then allowed slightly to close, with the result that the fork 18 falls on to the pin 19 while the pin 16 rides along the curved edge of slot 17 and leaving passage 21, takes up a position in passage 22, in which attitude the arms support the lid as shown in Figure 3.

Figure 4:
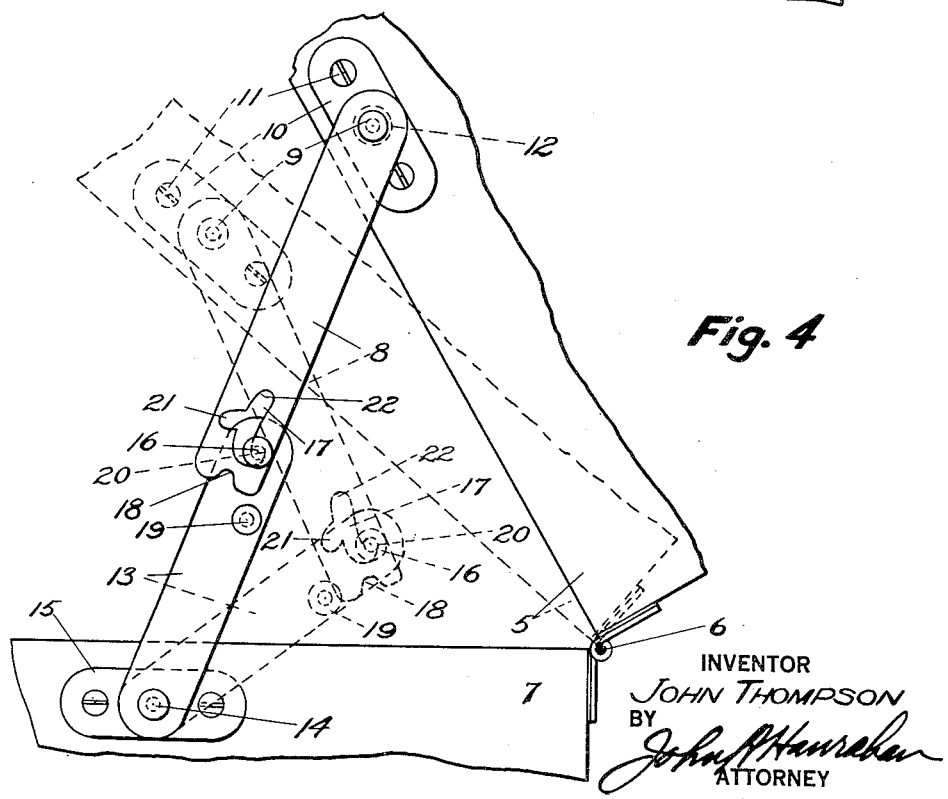
Fig. 4 represents the lid in its extreme open position immediately prior to closing; and (in dotted lines) the lid being closed.

To close the lid it is first raised slightly, when pin 16 slides along the slot 17 from passage 22 back to passage 20 where it rides in a deepened recess which is so shaped as to prevent direct return of the pin to passage 22, as shown by full lines in Fig. 4. This sliding movement is possible on account of friction washer 12 which by retaining arm 8 in its temporary position on the lid, allows the arm 13 to fall about its pivot thus positioning pin 16 in passage 22 and removing pin 19 from under slot 18. The lid can then be closed as shown by dotted lines in Fig. 4, and reaches its closed position shown in Fig. 1, where the arms are in position ready to repeat the operation when next required.

It is to be understood that the invention is not limited to any details of the modification described above which is given purely by way of example and which may be varied in many ways to overcome any difficulties arising and requirements to be fulfilled. Further, additional features may be incorporated to prevent undesirable effects. Thus for example, to prevent rattle of parts the members may be covered with cloth or similar material; or the pins and slots may be so particularly shaped and dimensioned as to have sliding fit without play; or springs attached to the pins, or to the edges of the slots may press them firmly together; or a spring attached to the lower arm 13 may always exert a force tending to close it inwardly about its pivot 14. Such and similar features are intended to be covered herein and may be incorporated without departing from the scope of the invention.

Having now particularly described and ascertained the nature of my said invention and in what manner the same is to be performed, I declare that what I claim is:—

1. A lid support comprising an arm pivotally attached to a lid, an arm pivotally attached to a box, said arms adapted to cooperate in such a manner that the arms automatically assume the relative positions necessary to lock together to form a support as the lid is being raised and automatically assume relative positions of release as the lid is about to be closed in order to allow closure to be effected, said arms connected by a pin and slot connection, and said slot formed of three passages preferably in substantially a Y formation.

2. A lid support comprising an arm pivotally attached to a lid, an arm pivotally attached to a box, said arms adapted to cooperate in such a manner that the arms automatically assume the relative positions necessary to lock together to form a support as the lid is being raised and automatically assume relative positions of release as the lid is about to be closed in order to allow closure to be effected, said arms connected by a pin and slot connection, and said passages of the slot so shaped as to guide the pin in pre-arranged order along the arms of the Y.

3. A lid support comprising an arm pivotally attached to a lid, an arm pivotally attached to a box, said arms adapted to cooperate in such a manner that the arms automatically assume the relative positions necessary to lock together to form a support as the lid is being raised and automatically assume relative positions of release as the lid is about to be closed in order to allow closure to be effected, said arms connected by a pin and slot connection, and said slot of Y formation so that relative movement between the arms cannot take other than a pre-arranged order.

4. A lid support comprising an arm pivotally attached to a lid, an arm pivotally attached to a box, said arms adapted to cooperate in such a manner that the arms automatically assume the relative positions necessary to lock together to form a support as the lid is being raised and automatically assume relative positions of release as the lid is about to be closed in order to allow closure to be effected, said arms connected by a pin and Y shaped slot connection, and frictional means associated with the arm pivoted to the lid and tending to delay pivotal movement thereof while the other arm is freely pivoted to be readily responsive to the force of gravity whereby the pin goes through a definite cycle of movement in said slot as the lid is opened and closed.

5. A lid support comprising a first arm pivotally attached to a lid, a second arm pivotally attached to a box, said first arm having a slot therein including three connected passages forming a substantially Y shape, a pin on the second arm and operating in said slot, a pin on said second arm below said first pin, said first arm having a notch in its free end, a friction means between the first arm and the lid whereby said arm is not freely pivoted, said first pin having a normal position in one passage of said slot when the lid is closed, said first arm adapted to move with the lid in the initial movement of the lid to open position whereby said pin gravitates into another passage of the slot, and said first pin adapted to move into the third passage of said slot with the notch of the first arm receiving the second pin when the lid is in open position.

6. A lid support comprising a first arm pivotally attached to a lid, a second arm pivotally attached to a box, said first arm having a slot therein including three connected passages forming a substantially Y shape, a pin on the second arm and operating in said slot, a friction means between the first arm and the lid whereby said arm is not freely pivoted, said pin having a normal position in one passage of said slot when the lid is closed, said first arm adapted to move with the lid in the initial movement of the lid to open position whereby said pin gravitates into another passage of the slot, and said pin adapted to move into the third passage of said slot when the lid is in open position.

Signed at Roade in the county of Northampton, England, this 12th day of November, A. D. 1930.

JOHN THOMPSON.